United States Patent Office 3,798,279
Patented Mar. 19, 1974

3,798,279
PROCESS FOR HYDROGENATING AROMATIC HYDROCARBONS TO NAPHTHENIC HYDROCARBONS OF HIGH PURITY AND CATALYST THEREFOR
Maurice Cessou, Chez M. Alberto, Rue la Vesina 69, Irigny, France, and Jean Cosyns, Rue de Sannois 92, Nanterre, France
No Drawing. Filed Aug. 30, 1971, Ser. No. 176,320
Claims priority, application France, Sept. 8, 1970, 7032661
Int. Cl. C07c 5/14
U.S. Cl. 260—667   9 Claims

ABSTRACT OF THE DISCLOSURE

Aromatic hydrocarbons are hydrogenated to the corresponding naphthenic hydrocarbons in a two-step process. The first step is carried out in the liquid phase with a group VIII metal as catalyst. The second step is carried out in the liquid or gaseous phase with a group VIII metal oxide as catalyst. For example, benzene is hydrogenated to cyclohexane with Raney nickel and supported nickel as respective catalysts.

---

This invention relates to a process for hydrogenating aromatic hydrocarbons in at least two steps. A major part of the aromatic hydrocarbon conversion is carried out in a first step, and in a second step, the remaining part of the aromatic hydrocarbon is hydrogenated to produce a naphthene of high purity.

This process is based on the use of a group VIII metal essentially in the metal state as first step catalyst, and a group VIII metal essentially in the form of an oxide as second step catalyst.

Many processes for hydrogenating aromatics are known and produce pure naphthenes from aromatic hydrocarbons. However, it is necessary to define what is meant by purity and how the purity requirements have changed during the last several years. Thus, some years ago, a purity of 99.9%, i.e. about 0.1% of impurities, was considered as outstanding; this is no longer true, and the impurities are now calculated as parts per million and no longer as tenths of one percent. When, for example, benzene is so hydrogenated as to eliminate the last traces thereof, traces of hexanes, pentanes and methyl cyclopentane are formed. With conventional processes, these impurities may amount to 0.1% (1,000 p.p.m.) or more; conversely as the purity requirements are increased, it becomes more difficult in some cases to utilize these processes on an industrial scale. Thus the tolerable amount of impurities is generally 500 p.p.m., if not 100 p.p.m.

The new hydrogenation process of this invention satisfies the highest purity requirements, for example the 100 p.p.m. impurities content for the naphthenic product. This process comprises passing an aromatic hydrocarbon with a stoichiometric excess of hydrogen through a first reaction vessel containing a group VIII metal either unsupported or supported on a conventional carrier such as, for example, silica or alumina, this vessel being operated in liquid, vapor or mixed phase. The first step catalyst may consist of, for example, nickel, cobalt, platinum, palladium or rhodium. Cobalt and nickel are preferred for economic reasons. The latter may be used, for example, as Raney nickel or cobalt in liquid phase, or as supported metal in fixed, moving or suspended bed; in this case, whenever charged into the reaction vessel as metal oxide, the catalyst will be reduced with hydrogen at a temperature of from 320 to 500° C. The group VIII metal of the first step catalyst is present in a major proportion, i.e. more than 80% by weight, in the metallic state. With this metal catalyst practically free of oxide, conversion rates of aromatics to naphthenes of 95 to 99.9% or more may be obtained in the first step.

The products withdrawn from the first step are conveyed to a second step in which hydrogenation is carried out in contact with a catalyst containing a group VIII metal mainly in the form of an oxide. The second step is conducted in the liquid or vapor phase, the catalyst being preferably supported. However, according to a preferred embodiment, the second step is carried out in the gaseous phase with a nickel or cobalt catalyst on an alumina or silica carrier. It has been found that, in contrast with the first step catalyst, the group VIII metal, for example nickel or cobalt, must be in the form of an oxide to avoid, when hydrogenating benzene, for example, such impurities as pentane, hexane and methyl cyclopentane. Preferably, the catalyst consists of nickel or cobalt with at least 60% and preferably 75–95% by weight of oxide. Nickel and cobalt oxides may amount to 1–50% of the total catalyst weight. The analysis of the oxide and metal phases may be carried out by the X-ray diffraction or the hydrogen chemisorption.

The catalysts of the two steps may be manufactured according to known methods by impregnation, mixing or coprecipitation of the precursor metal salts with the carrier. More particularly the first step catalyst may be Raney nickel or cobalt. The second step catalyst will be preferably a supported metal such as nickel or cobalt as an oxide. In contrast to the first step catalyst, when supported, it must be pretreated with hydrogen at temperaures of 150–300° C. and no at higher temperature (320–500° C.) to obtain the catalyst phase.

The operating conditions of the first step may be varied according to the type of aromatic hydrocarbon and the catalyst. For example, the following conditions may be used: a temperature of from 50 to 250° C., a space velocity (hourly volume of aromatic hydrocarbon per volume of catalyst: VVH) of from 1 to 10, when the catalyst is in a fixed bed, or a specific injection (hourly weight of benzene per weight unit of catalyst) of 5–50 when the catalyst is used as a powder suspended in the reaction liquid mixture, and a preferred pressure of 5–50 kg./cm.$^2$.

The second step is preferably carried out in the vapor phase under the following conditions: a temperature of from 100 to 275° C., preferably 180–240° C., a VVH of 1–10, a hydrogen partial pressure of 3–50 kg./cm.$^2$ with a total pressure of 5–80 kg./cm.$^2$. The hydrogen containing gas may also contain gaseous hydrocarbons such as methane and ethane or other inert gases such as $N_2$, for example.

The following examples are given for illustrative purposes:

EXAMPLE I

Benzene of high purity is to be hydrogenated: it has a crystallization point of 5.5° C. corresponding to a total impurities content of about 400 p.p.m. as shown hereunder:

|  | P.p.m. |
|---|---|
| $C_6$ paraffins | 30 |
| $C_7$ paraffins | 250 |
| Cyclohexane | 100 |
| Toluene | 20 |

Cyclohexane with the following composition is desired:

| | |
|---|---|
| Crystallization point, ° C. | 6.46 |
| Total impurities, p.p.m. maximum | 400 |

Since the benzene of the charge contains 300 p.p.m. of impurities other than cyclohexane, not more than 100 p.p.m. of impurities may be formed during the hydrogenation. The latter may be carried out as follows:

In a first step, benzene is hydrogenated as follows:

Pressure _____kg./cm.$^2$__ 40
Temperature _____° C__ 200

The catalyst is Raney nickel suspended in the liquid reaction mixture by stirring. Benzene is continuously introduced at a specific injection rate of 25.

The gaseous effluent from the first reaction vessel contains unconsumed hydrogen, benzene and cyclohexane. The purity of the resulting cyclohexane is very high for a few days; then it progressively decreases to only 95% at the end of the experiment.

The content of residual benzene progressively increases as a result of the progressively deactivation of Raney nickel in the first reaction vessel. The effluent is conveyed to the second reaction vessel, also called finishing reactor, the operating conditions of which are as follows:

Hydrogen partial pressure _____kg./cm.$^2$__ 6
VVH (space velocity) _____ 2
Inlet temperature _____° C__ 180
Maximum temperature in the reactor _____° C__ 240

The catalyst of the second reactor is manufactured by impregnating 15% of nickel from nickel nitrate onto transition alumina pellets of 250 m.$^2$/g. and 0.65 cc./g. total pore volume, drying and roasting at 300° C. for 6 hours.

A part of this catalyst ($C_1$) is treated with pure hydrogen for 15 hours at 250° C., a pressure of 2 kg./cm.$^2$ and an injection rate of 800 liters per liter of catalyst.

The resulting catalyst has a hydrogen chemisorption of 0.25 cc. TPN per gram of catalyst. The X-ray diffraction diagram of the crushed catalyst has only shown rays corresponding to the nickel oxide phase.

A second part of this catalyst ($C_2$) has been treated with hydrogen under the same conditions as before, except a temperature of 350° C. After this, the catalyst has a hydrogen chemisorption of 2.5 cc. NTP per gram of catalyst. The X-ray diffraction digram shows that nickel is essentially in the metal state.

The following table gives the results obtained with catalysts $C_1$ and $C_2$ at the outlet of the finishing reactor.

| Benzene content in the charge to the finishing reactor, percent | Reactor temperature, ° C. | Catalyst | Impurities formed, p.p.m. | | | Residual benzene, p.p.m. |
|---|---|---|---|---|---|---|
| | | | $C_5$ paraffins | $C_6$ paraffins | Methyl cyclopentane | |
| 0.1 | 200 | $C_1$ | 0 | 0 | 0 | <5 |
| | | $C_2$ | 0 | 5 | 10 | <5 |
| 2.5 | 220 | $C_1$ | 0 | 0 | 10 | <5 |
| | | $C_2$ | 2 | 20 | 20 | <5 |
| 5 | 240 | $C_1$ | 10 | 40 | 25 | 7 |
| | | $C_2$ | 40 | 300 | 100 | 7 |

The temperature in the finishing reactor depends on the content of residual benzene. As shown before, the higher this content the higher the temperature since the reaction is exothermic. Less than 100 p.p.m. of impurities are formed with catalyst $C_1$, and only with this catalyst.

EXAMPLE II

The charge and the hydrogenation first step are the same as in Example I.

The finishing reactor contains a catalyst manufactured by impregnating 20% of cobalt from cobalt nitrate onto transition alumina pellets of the same type as in Example I, drying and roasting at 300° C. for 6 hours.

A first part $C'_1$ of this catalyst is treated with hydrogen at 280° C. for 15 hours, at a hydrogen partial pressure of 2 kg./cm.$^2$ and a feed rate of 800 liters per liter of catalyst. The resulting product has a hydrogen chemisorption of 0.21 cc. NTP per gram of catalyst. The X-ray diffraction diagram shows only cobalt oxide.

A second part $C'_2$ of this catalyst is treated with hydrogen under the same conditions except a temperature of 380° C. Then the hydrogen chemisorption is 2.4 cc. NTP per gram of catalyst. The X-ray diffraction diagram shows that cobalt is essentially in the metal form.

The following table summarizes the results obtained with catalysts $C'_1$ and $C'_2$ at the outlet of the finishing reactor.

| Benzene content in the charge to the finishing reactor, percent | Reactor temperature, ° C. | Catalyst | Impurities formed, p.p.m. | | | Residua, benzene, p.p.m. |
|---|---|---|---|---|---|---|
| | | | $C_5$ paraffins | $C_6$ paraffins | Methyl cyclopentane | |
| 2.5 | 220 | $C'_1$ | 0 | 0 | 12 | <5 |
| | | $C'_2$ | 3 | 18 | 22 | <5 |
| 5 | 240 | $C'_1$ | 8 | 35 | 30 | 9 |
| | | $C'_2$ | 36 | 270 | 120 | 9 |

This table shows that catalyst $C'_1$ of this invention gives less than 100 p.p.m. of total impurities in all cases, while catalyst $C'_2$ is only acceptable for a benzene content of 2.5%: when the benzene content increases, a large amount of impurities is formed. This illustrates the advantage of the process of this invention, whereby it is possible to delay the regeneration of the first step catalyst.

The experiments of the above examples may be successfully repeated with:

toluene for manufacturing methyl cyclohexane
xylenes for manufacturing di-methyl-cyclohexanes

What we claim as our invention is:

1. A process for hydrogenating an aromatic hydrocarbon to a naphthenic hydrocarbon in two successive steps, wherein, in a first step, the aromatic hydrocarbon in the liquid phase and hydrogen are contacted with Raney nickel suspended in said liquid phase at 50–250° C., and an effluent gaseous phase is removed therefrom, the contact time being sufficient to lower the aromatic hydrocarbon content of said effluent gaseous phase to 0.1–5% by weight of the hydrocarbon content of this effluent phase, and, in a second step, the effluent from the first step in gaseous phase is contacted at 100–275° C. with a supported nickel or cobalt catalyst in a fixed bed, at least 60% by weght of nickel or cobalt in said supported catalys being in the form of nickel or cobalt oxide, said supported catalyst having been derived from a step of contacting hydrogen with supported nickel oxide or cobalt oxide at 150–300° C.; and with the provision than when said hydrogenating of said aromatic hydrocarbon is initiated, said supported nickel or cobalt catalyst has been pretreated with hydrogen at 150–300° C.

2. A process according to claim 1, wherein the second step catalyst contains 75–95% by weight of nickel or cobalt in the form of nickel or cobalt oxide.

3. A process according to claim 1, wherein the aromatic hydrocarbon is benzene and the second step is carried out with a supported nickel oxide catalyst.

4. A process according to claim 1, wherein the second step temperature is 180–240° C.

5. A process according to claim 1 wherein the first step is conducted with a specific injection hourly weight of aromatic hydrocarbon per weight unit of catalyst of 5–50.

6. A process according to claim 5 wherein the first step is conducted with a stoichiometric excess of hydrogen under a pressure of 5–50 kg./cm.$^2$.

7. A process according to claim 1 wherein the second stage catalyst is supported on an alumina or silica carrier.

8. A process according to claim 1 wherein the second step is conducted at a space velocity of 1–10 and a hydrogen partial pressure of 3–50 kg./cm.$^2$.

9. A process according to claim 1 wherein said aromatic hydrocarbon is selected from the group consisting of benzene, toluene and xylene.

References Cited
UNITED STATES PATENTS

| | | | |
|---|---|---|---|
| 3,130,240 | 4/1964 | Stark | 260—667 |
| 3,202,723 | 8/1965 | Thonon | 260—667 |

PAUL M. COUGHLAN, Jr., Primary Examiner

V. O'KEEFE, Assistant Examiner

UNITED STATES PATENT OFFICE
CERTIFICATE OF CORRECTION

Patent No. 3,798,279　　　　　　　　　Dated　March 19, 1974

Inventor(s) Maurice Cessou, et al.

It is certified that error appears in the above-identified patent and that said Letters Patent are hereby corrected as shown below:

IN THE HEADING, COLUMN 1:　Insert the Assignee of Record

-- Institut Francais du Petrole, Carburants et Lubrifiants,

Rueil-Malmaison, FRANCE --.

IN THE CLAIMS, COLUMN 4, CLAIM 1, LINE 14 OF THE CLAIM:

"catalys" should read -- catalyst --; and LINE 17 OF THE CLAIM:

"than" should read -- that --.

Signed and sealed this 9th day of July 1974.

(SEAL)
Attest:

McCOY M.GIBSON,JR.　　　　　　　　C. MARSHALL DANN
Attesting Officer　　　　　　　　Commissioner of Patents